(12) United States Patent
Kozono et al.

(10) Patent No.: US 12,437,647 B2
(45) Date of Patent: Oct. 7, 2025

(54) DRIVING ASSISTANCE APPARATUS, DRIVING ASSISTANCE METHOD, AND NON-TRANSITORY RECORDING MEDIUM

(71) Applicant: SUBARU CORPORATION, Tokyo (JP)

(72) Inventors: Kazuya Kozono, Tokyo (JP); Takamichi Kirihara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 162 days.

(21) Appl. No.: 18/467,032

(22) Filed: Sep. 14, 2023

(65) Prior Publication Data

US 2024/0127696 A1 Apr. 18, 2024

(30) Foreign Application Priority Data

Oct. 12, 2022 (JP) ................................ 2022-164086

(51) Int. Cl.
*G08G 1/16* (2006.01)
*B60W 30/095* (2012.01)
*B60W 50/00* (2006.01)

(52) U.S. Cl.
CPC ......... *G08G 1/166* (2013.01); *B60W 30/0953* (2013.01); *B60W 30/0956* (2013.01); *B60W 50/0097* (2013.01); *B60W 2520/14* (2013.01)

(58) Field of Classification Search
CPC .............. G08G 1/166; B60W 30/0953; B60W 30/0956; B60W 50/0097; B60W 2520/14
See application file for complete search history.

(56) References Cited

U.S. PATENT DOCUMENTS

| | | | | |
|---|---|---|---|---|
| 2016/0144896 A1* | 5/2016 | Takahashi | ................ | B62D 6/00 701/41 |
| 2016/0207534 A1* | 7/2016 | Nishimura | ...... | B60W 30/18145 |
| 2018/0099665 A1* | 4/2018 | You | ........................ | G01S 13/931 |
| 2018/0174463 A1* | 6/2018 | Ohta | ...................... | B60W 30/09 |
| 2021/0048818 A1* | 2/2021 | Funke | .................... | G05D 1/617 |
| 2021/0370924 A1 | 12/2021 | Kuno et al. | | |
| 2022/0204083 A1* | 6/2022 | Kim | .......................... | G06T 7/70 |
| 2022/0348139 A1* | 11/2022 | Roeber | ................. | B60Q 1/535 |
| 2023/0339502 A1* | 10/2023 | Chi-Johnston | ......... | G06N 20/00 |
| 2023/0347882 A1* | 11/2023 | Tian | ...................... | B60W 40/04 |

FOREIGN PATENT DOCUMENTS

JP 2021-187207 A 12/2021

* cited by examiner

*Primary Examiner* — Hussein Elchanti
(74) *Attorney, Agent, or Firm* — Rimon P.C.

(57) ABSTRACT

A driving assistance apparatus includes an electronic control unit. The electronic control unit: calculates a first predicted path of a first vehicle to which the driving assistance apparatus is to be applied, the first predicted path being indicated by a circle having a radius obtained from a yaw rate of the first vehicle at a prediction reference time; calculates a second predicted path of a second vehicle, based on data regarding the second vehicle at the prediction reference time; calculates a provisional contact point, based on an intersection point of the first predicted path and the second predicted path; calculates a provisional contact time when the first vehicle reaches the provisional contact point; and determines whether the first vehicle and the second vehicle come into contact with each other, assuming that the first vehicle and the second vehicle at the provisional contact time travel straight to cross each other.

10 Claims, 17 Drawing Sheets

DRIVING ASSISTANCE APPARATUS, DRIVING ASSISTANCE METHOD, AND NON-TRANSITORY RECORDING MEDIUM

CROSS-REFERENCE TO RELATED APPLICATIONS

The present application claims priority from Japanese Patent Application No. 2022-164086 filed on Oct. 12, 2022, the entire contents of which are hereby incorporated by reference.

BACKGROUND

The disclosure relates to a driving assistance apparatus, a driving assistance method, and a non-transitory recording medium that determine whether contact of a vehicle occurs.

A known driving assistance apparatus detects another vehicle (a target vehicle) around an own vehicle, and determines a possibility of contact between the own vehicle and the target vehicle. Japanese Unexamined Patent Application Publication (JP-A) No. 2021-187207 discloses a driving assistance apparatus that assumes that an own vehicle travels straight while keeping a current speed, and that a target vehicle keeps a current speed. The driving assistance apparatus identifies the target vehicle as a crossing target, when the own vehicle and the target vehicle are predicted to come into contact with each other in a crossing region where a region through which the target vehicle is predicted to pass and a region through which the own vehicle passes overlap with each other. The driving assistance apparatus controls a braking device of the own vehicle to cause the own vehicle to decelerate at a deceleration rate from a time before a predicted contact time when the own vehicle and the crossing target are predicted to come into contact with each other.

SUMMARY

An aspect of the disclosure provides a driving assistance apparatus including an electronic control unit. The electronic control unit is configured to: calculate a first predicted path of a first vehicle to which the driving assistance apparatus is to be applied, the first predicted path being indicated by a circle having a radius obtained from a yaw rate of the first vehicle at a prediction reference time; calculate a second predicted path of a second vehicle, based on data regarding the second vehicle at the prediction reference time; calculate a provisional contact point, based on an intersection point of the first predicted path and the second predicted path; calculate a provisional contact time when the first vehicle reaches the provisional contact point; and determine whether the first vehicle and the second vehicle come into contact with each other, assuming that the first vehicle and the second vehicle at the provisional contact time travel straight to cross each other.

An aspect of the disclosure provides a driving assistance method including: calculating a first predicted path of a first vehicle to which the driving assistance method is to be applied, the first predicted path being indicated by a circle having a radius obtained from a yaw rate of the first vehicle at a prediction reference time; calculating a second predicted path of a second vehicle, based on data regarding the second vehicle at the prediction reference time; calculating a provisional contact point, based on an intersection point of the first predicted path and the second predicted path; calculating a provisional contact time when the first vehicle reaches the provisional contact point; and determining whether the first vehicle and the second vehicle come into contact with each other, assuming that the first vehicle and the second vehicle at the provisional contact time travel straight to cross each other.

An aspect of the disclosure provides a non-transitory computer readable recording medium containing a program. The program causes, when executed by a computer, the computer to implement a method. The method includes: calculating a first predicted path of a first vehicle to which the method is to be applied, the first predicted path being indicated by a circle having a radius obtained from a yaw rate of the first vehicle at a prediction reference time; calculating a second predicted path of a second vehicle, based on data regarding the second vehicle at the prediction reference time; calculating a provisional contact point, based on an intersection point of the first predicted path and the second predicted path; calculating a provisional contact time when the first vehicle reaches the provisional contact point; and determining whether the first vehicle and the second vehicle come into contact with each other, assuming that the first vehicle and the second vehicle at the provisional contact time travel straight to cross each other.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
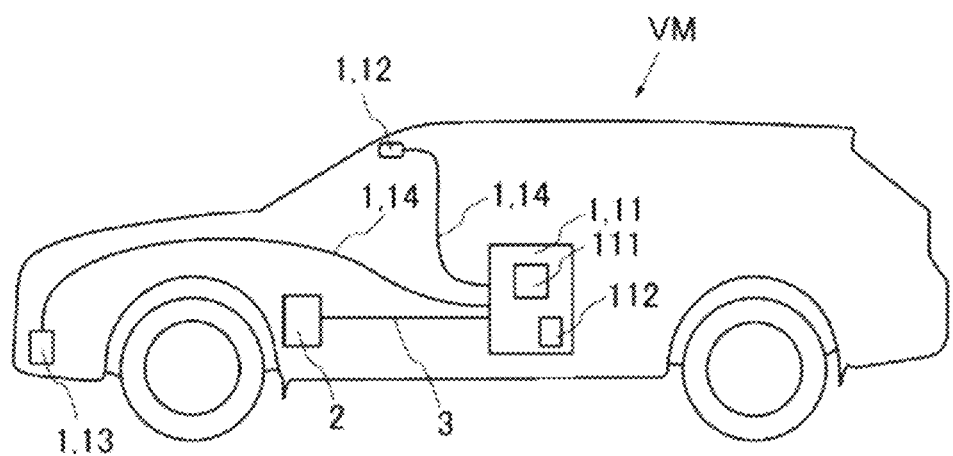
FIG. 1 is a diagram illustrating a driving assistance apparatus to be mounted on a vehicle.

A contact determination apparatus in JP-A No. 2021-187207 is effective when an own vehicle is traveling straight. However, it is difficult for contact determination to operate when the own vehicle is traveling while turning at, for example, a curve or an intersection.

It is desirable to provide a driving assistance apparatus and a driving assistance method that make it possible to perform contact determination when an own vehicle is traveling while turning, and a non-transitory recording medium containing a program that makes it possible to execute such a driving assistance method.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a vehicle mounted with a driving assistance apparatus 1 according to an example embodiment of the disclosure. The vehicle in FIG. 1 may be referred to as a vehicle VM. The vehicle VM may thus be distinguished from a vehicle (a target vehicle VS) as a target with which whether the vehicle VM comes into contact is to be determined. The vehicle VM may serve as an own vehicle. The driving assistance apparatus 1 may include an electronic control unit (ECU) 11, cameras 12, radar sensors 13, and a wiring line 14. The wiring line 14 may couple the ECU 11 to the cameras 12 and the radar sensors 13. The ECU 11 may include a central processing unit (CPU) 111 and a memory 112. Two cameras 12 may be arranged in a left-right direction on an inside of a windshield. One radar sensor 13 may be disposed on each of the left and the right at the front of the vehicle VM. In addition, the ECU 11 may be coupled to a braking device 2 of the vehicle VM via a communication line 3. In one embodiment, the vehicle VM may serve as a "first vehicle". In one embodiment, the target vehicle VS may serve as a "second vehicle".

Images captured by the two cameras 12, data detected by the two radar sensors 13, and data detected by unillustrated various sensors may be sent to the ECU 11 via the wiring line 14. The various sensors may include a speed sensor, a lateral acceleration sensor, and a steering wheel rotation angle sensor. The image and the data sent to the ECU 11 may be analyzed by the CPU 111 using software held in the memory 112. The CPU 111 and the memory 112 may configure a computer. When the ECU 11 determines that an action is to be taken in response to contact, the ECU 11 may take an action such as transmitting a braking command to the braking device 2 via the communication line 3.

Figure 2:
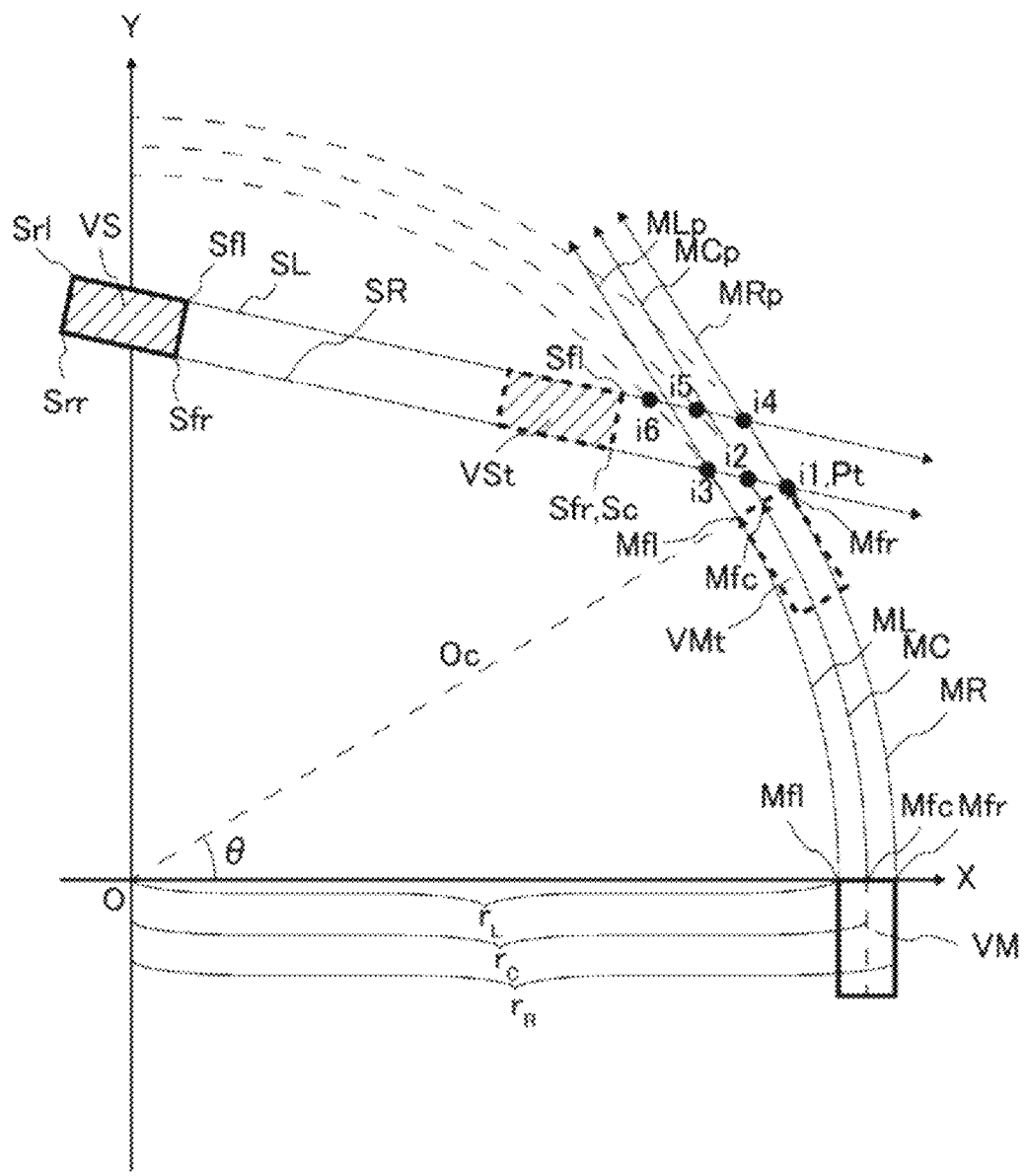
FIG. 2 is a diagram illustrating curves of circles of the vehicle and straight lines of a target vehicle.

FIG. 2 illustrates predicted paths of the vehicle VM and the target vehicle VS to be used to determine contact. FIG. 2 is a top view of the vehicle VM and the target vehicle VS and the predicted paths. The vehicle VM and the target vehicle VS indicated by solid lines may be positions at a prediction reference time Ts. An XY coordinate system in FIG. 2 may be a coordinate system in which an origin O is a turning center of the vehicle VM, a +Y direction is a front direction of the vehicle VM, and a Y coordinate of the front of the vehicle VM is 0 (zero). A prediction may be made assuming that the vehicle VM turns along a circle centered around the origin O, i.e., the turning center, and that the target vehicle VS travels straight. In the example embodiment, contact determination may be performed based on data, including positions, speeds, and yaw rates, regarding the vehicle VM and the target vehicle VS at the prediction reference time Ts. In FIG. 2, a vehicle VMt and a target vehicle VSt indicated by dotted lines may be positions of the vehicle VM and the target vehicle VS at a provisional contact time Tt to be described later.

In FIG. 2, curves extending from the middle and opposite sides of the vehicle VM indicate own vehicle predicted paths that are predicted paths of respective parts of the vehicle VM. An own vehicle right predicted path MR may be an own vehicle predicted path of a front right end Mfr of the vehicle VM, i.e., an own vehicle predicted path on the right side. An own vehicle middle predicted path MC may be an own vehicle predicted path of a front middle Mfc of the vehicle VM, i.e., an own vehicle predicted path in the middle. An own vehicle left predicted path ML may be an own vehicle predicted path of a front left end Mfl, of the vehicle VM, i.e., an own vehicle predicted path on the left side. In the example embodiment, after the provisional contact time Tt, prediction and contact determination may be performed assuming that the vehicle VMt travels along the own vehicle predicted paths including straight lines, i.e., an own vehicle right predicted path MRp, an own vehicle middle predicted path MCp, and an own vehicle left predicted path MLp, in FIG. 2. In one embodiment, the own vehicle predicted path may serve as a "first predicted path". In one embodiment, the own vehicle right predicted path MR may serve as a "first predicted path on a right side". In one embodiment, the own vehicle left predicted path ML may serve as a "first predicted path on a left side".

In addition, in FIG. 2, straight lines extending from opposite sides of the target vehicle VS indicate target vehicle predicted paths that are predicted paths of respective parts of the target vehicle VS. A target vehicle right predicted path SR may be a target vehicle predicted path of a front right end Sfr of the target vehicle VS, and a target vehicle left predicted path SL may be a target vehicle predicted path of a front left end Sfl of the target vehicle VS. The target vehicle predicted paths may be calculated based on data regarding the target vehicle VS at the prediction reference time Ts. In one embodiment, the target vehicle predicted path may serve as a "second predicted path". In one embodiment, the target vehicle right predicted path SR may serve as a "second predicted path on a right side". In one embodiment, the target vehicle left predicted path SL may serve as a "second predicted path on a left side".

In example embodiments of the disclosure, a prediction is made assuming that the vehicle VM travels along a circle in a first stage of a contact determination process, and that the vehicle VM travels straight in a second stage of the contact determination process. The own vehicle right predicted path MR, the own vehicle middle predicted path MC, and the own vehicle left predicted path ML illustrated in FIG. 2 may be respective portions of three circles centered around the origin O of the XY coordinate system illustrated in FIG. 3, and may be used for processing in the first stage. As illustrated in FIG. 2, the own vehicle right predicted path MR may have a radius $r_R$, the own vehicle middle predicted path MC may have a radius $r_C$, and the own vehicle left predicted path ML may have a radius $r_L$. These radii may be obtained from the yaw rate of the vehicle VM. In addition, in the example embodiment, it may be predicted that the target vehicle VS travels linearly.

In the example embodiment, the ECU 11 may calculate the own vehicle predicted path as a circle having a radius obtained from the position, a traveling direction, the yaw rate, and the speed of each part of the vehicle VM at the prediction reference time Ts. Calculated as the own vehicle predicted path may be the own vehicle right predicted path MR, the own vehicle middle predicted path MC, and the own vehicle left predicted path ML illustrated in FIGS. 2 and 3. In addition, the ECU 11 may calculate the target vehicle predicted path based on the position, the traveling direction, and the speed of each part of the target vehicle VS at the prediction reference time Ts. Calculated as the target vehicle predicted path may be the target vehicle right predicted path SR and the target vehicle left predicted path SL illustrated in FIGS. 2 and 3. Thereafter, the ECU 11 selects a provisional contact point Pt from intersection points i of the own vehicle predicted path and the target vehicle predicted path, and calculates the provisional contact time Tt when the vehicle VM reaches the provisional contact point Pt. In FIG. 2, the vehicle VMt and the target vehicle VSt indicated by dotted-line frames may be positions of the vehicle VM and the target vehicle VS at the provisional contact time Tt. The provisional contact time Tt may serve as a boundary between the first stage and the second stage in the contact determination process. Thereafter, the ECU 11 determines whether the vehicle VM and the target vehicle VS come into contact with each other, assuming that the vehicle VMt and the target vehicle VSt travel straight from the provisional contact time Tt to cross each other.

Next, with reference to flowcharts of FIGS. 4 to 7 and 12, description is given of a control executed until the vehicle VM performs a contact response operation based on driving assistance. Steps of the flowcharts indicate a driving assistance method. This control may be executed by the ECU 11 by the CPU 111 performing processing in accordance with a program held in the memory 112. This program may be held in a non-transitory computer readable recording medium.

Figure 4:
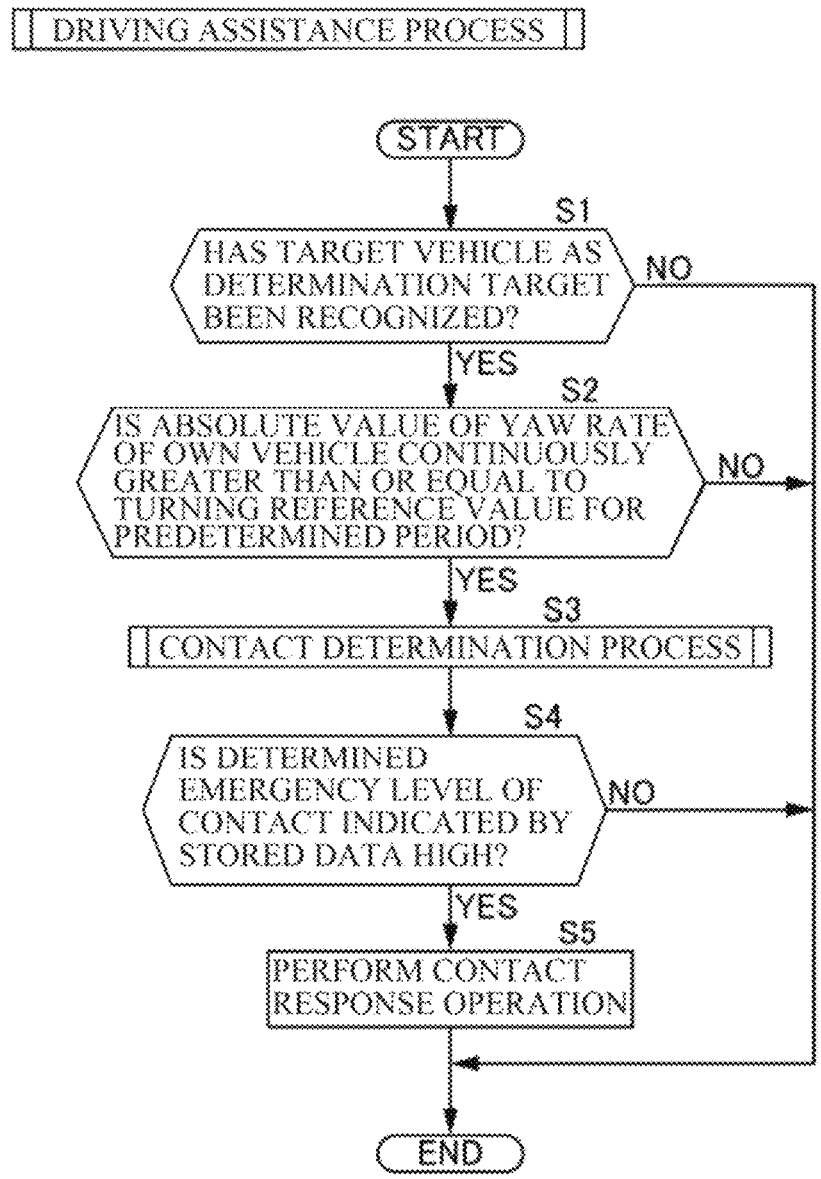
FIG. 4 is a flowchart illustrating a driving assistance process.

A driving assistance process illustrated in FIG. 4 may be started and repeatedly executed at predetermined time intervals. First, in steps S1 and S2, the ECU 11 may determine whether to start the contact determination process in step S3 and subsequent processes. In step S1, the ECU 11 may determine whether the target vehicle VS as a determination target has been recognized. The ECU 11 may analyze the images captured by the two cameras 12 and the data detected by the two radar sensors 13, and determine whether the target vehicle VS as a target of contact determination has been recognized. If the ECU 11 determines that the target vehicle VS has been recognized (YES in step S1), the ECU 11 may cause the flow to proceed to step S2. If the ECU 11 does not determine that the target vehicle VS has been recognized (NO in step S1), the ECU 11 may end the process, and wait for a start time of the next driving assistance process.

In the vehicle VM, the yaw rate may be calculated based on the speed, a lateral acceleration rate, and a steering wheel rotation angle detected from the various sensors. In step S2, if an absolute value of the yaw rate of the vehicle VM is continuously greater than or equal to a turning reference value for a predetermined period (YES in step S2), the ECU 11 may cause the flow to proceed to step S3, and perform the contact determination process at the time of turning. Otherwise (NO in step S2), the ECU 11 may end the process, and wait for the start time of the next driving assistance process.

Figure 5:
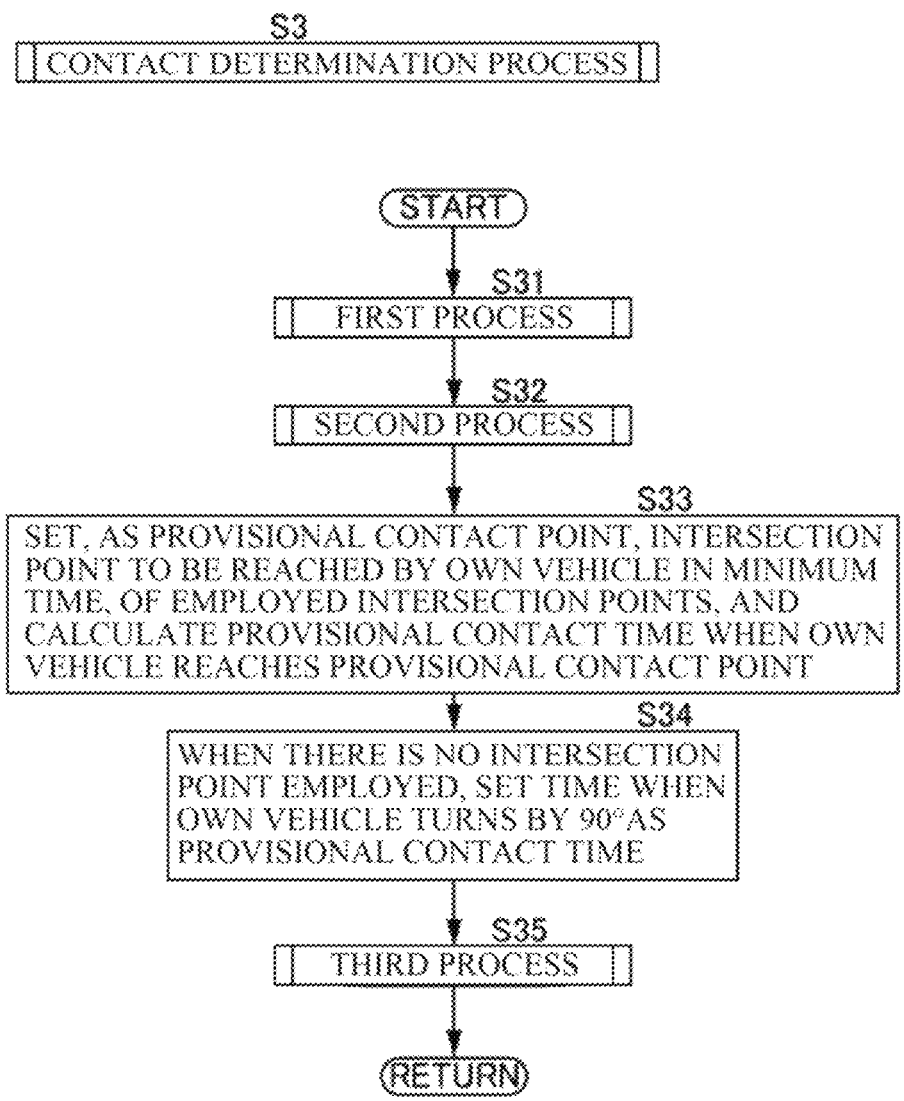
FIG. 5 is a flowchart illustrating a contact determination process.

FIG. 5 illustrates a subroutine of the contact determination process in step S3. In the contact determination process, the ECU 11 may perform a first process in step S31, a second process in step S32, and processes of steps S33 and S34, and thereafter perform a third process in step S35 and return to a main routine in FIG. 4.

In the first process in step S31, the ECU 11 may calculate the own vehicle predicted path and the target vehicle predicted path, assuming that the vehicle VM travels along the own vehicle predicted path indicated by a circle and the target vehicle VS travels in a uniform linear motion. Thereafter, the ECU 11 may calculate the intersection point i of the own vehicle predicted path and the target vehicle predicted path. The intersection point i may serve as a candidate for the provisional contact point Pt to be described later. Multiple intersection points i are obtained in some cases, and there is no intersection point i in some cases. Note that the first process may be a process of calculating the intersection points i of curves and straight lines, giving no consideration to timing. In the second process in step S32, the ECU 11 may narrow down candidates for the provisional contact point Pt from the obtained intersection points i. In step S33, the ECU 11 may determine the provisional contact point Pt from among the narrowed down candidate intersection points i, and calculate the provisional contact time Tt that is a time when the vehicle VM reaches the provisional contact point Pt. In step S34, when there are no candidate intersection points i from which the provisional contact point Pt is to be determined, the ECU 11 may determine, as the provisional contact time Tt, a time when the vehicle VM turns by 90° that is an upper limit angle of a predetermined angle range. Thereafter, in the third process in step S35, the ECU 11 may perform contact determination assuming that the vehicle VMt and the target vehicle VSt at the provisional contact time Tt travel straight in uniform linear motions to cross each other.

Figure 6:
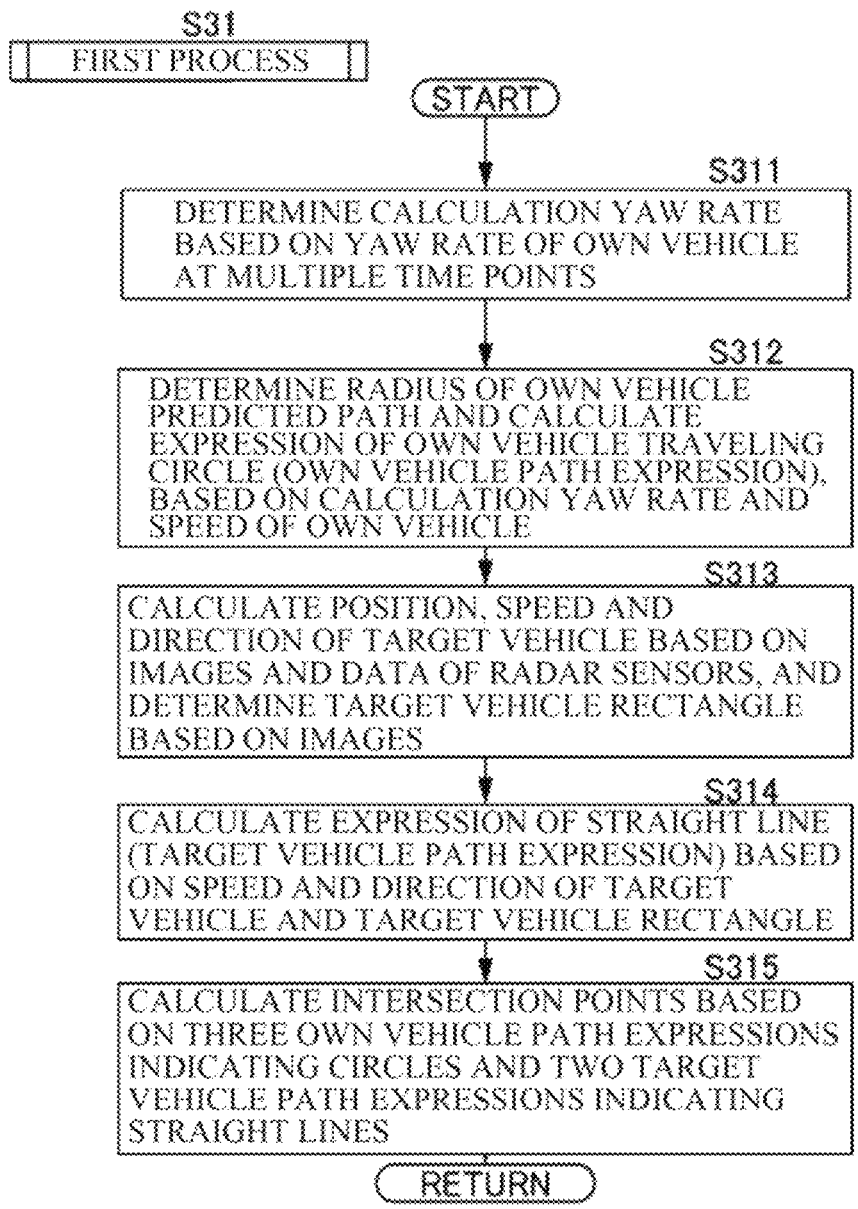
FIG. 6 is a flowchart illustrating a first process.

First, with reference to FIG. 6, description is given of a subroutine of the first process in step S31 of calculating the intersection points i serving as the candidates for the provisional contact point Pt. In step S311, the ECU 11 may determine a calculation yaw rate Yr, based on the yaw rate of the vehicle VM at multiple time points. In the example embodiment, the yaw rate at each time may be calculated based on the speed, the lateral acceleration rate, and the steering wheel rotation angle detected from the various sensors of the vehicle VM. In the example embodiment, of the latest yaw rates at five time points at predetermined intervals, three yaw rates excluding the maximum and minimum yaw rates may be averaged and determined as the calculation yaw rate Yr.

In subsequent step S312, the ECU 11 may determine the radius of the own vehicle predicted path and calculate an expression of an own vehicle traveling circle, i.e., an own vehicle path expression, based on the calculation yaw rate Yr and the speed of the vehicle VM. In the example embodiment, the ECU 11 may calculate the own vehicle path expression for each of the own vehicle right predicted path MR of the front right end Mfr, the own vehicle middle predicted path MC of the front middle Mfc, and the own vehicle left predicted path ML of the front left end Mfl illustrated in FIGS. 2 and 3.

Thus, the ECU 11 may calculate the radius $r_R$ of the own vehicle right predicted path MR, the radius $r_C$ of the own vehicle middle predicted path MC, and the radius $r_L$ of the own vehicle left predicted path ML illustrated in FIG. 2 based on, for example, the calculation yaw rate Yr and the speed of the vehicle VM and a width of the vehicle VM. The ECU 11 may obtain an own vehicle path expression (1) for the own vehicle right predicted path MR of the front right end Mfr of the vehicle VM. In addition, the ECU 11 may obtain an own vehicle path expression (2) for the own vehicle middle predicted path MC of the front middle Mfc, and obtain an own vehicle path expression (3) for the own vehicle left predicted path ML of the front left end Mfl.

$$x^2+y^2=r_R^2 \tag{1}$$

$$x^2+y^2=r_C^2 \tag{2}$$

$$x^2+y^2=r_L^2 \tag{3}$$

Figure 3:
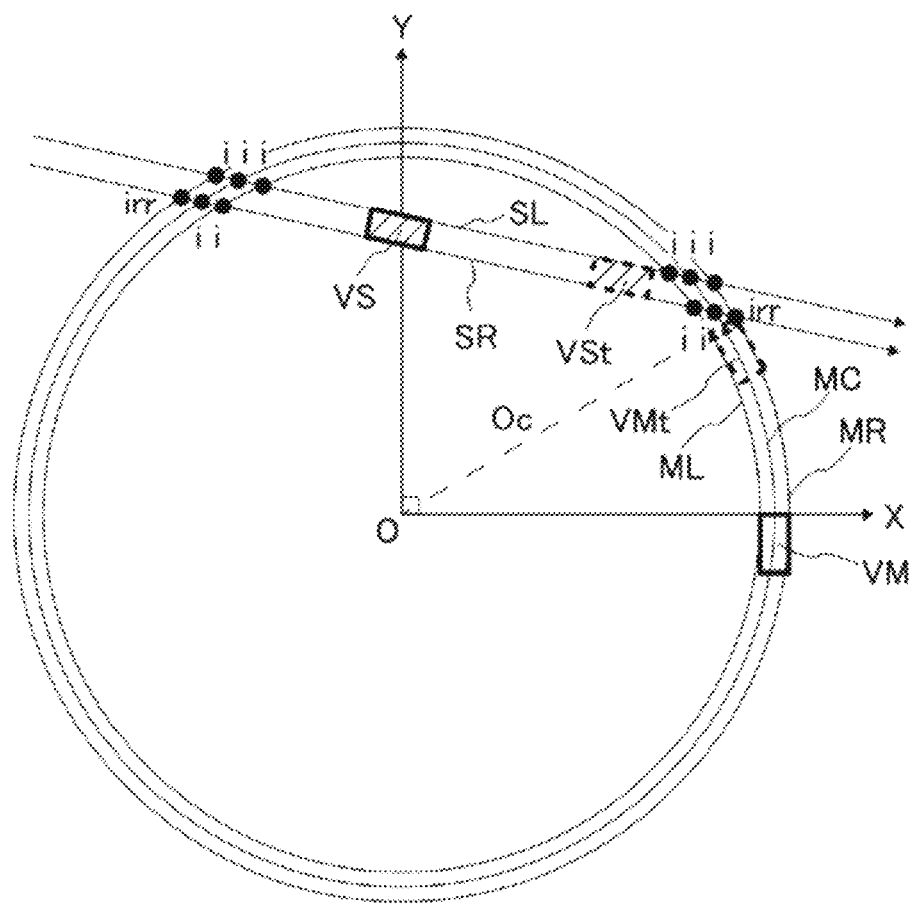
FIG. 3 is an overall view of predicted traveling paths of the vehicle and the target vehicle.

As illustrated in FIGS. 2 and 3, the XY coordinate system used here may be a coordinate system in which the origin O is the turning center of the vehicle VM, the +Y direction is the front direction of the vehicle VM, and the Y coordinate of the front of the vehicle VM is 0 (zero). In the expressions, $r_R$ may be a constant indicating the radius of the own vehicle right predicted path MR as the path of the front right end Mfr, $r_C$ may be a constant indicating the radius of the own vehicle middle predicted path MC as the path of the front middle Mfc, and $r_L$ may be a constant indicating the radius of the own vehicle left predicted path ML as the path of the front left end Mfl. As illustrated in FIGS. 2 and 3, the own vehicle path expression (1) to (3) may be expressed as the three circles whose radii $r_R$, $r_C$, and $r_L$ differ from each other by one-half the width of the vehicle VM. Note that $r_R$ may be the smallest when the vehicle VM makes a right turn, and $r_L$ may be the smallest when the vehicle VM makes a left turn.

Coordinates of the front right end Mfr, the front middle Mfc, and the front left end Mfl may be calculated based on data regarding the vehicle VM held in the memory 112 of the vehicle VM.

In subsequent step S313, the ECU 11 may calculate the position of the target vehicle VS at multiple time points, and calculate the speed and the direction of the target vehicle VS based on the position at the multiple time points. In addition, the ECU 11 may recognize the images obtained from the cameras 12 by using also the data detected by the radar sensors 13, and determine a rectangle occupied by the target vehicle VS on a horizontal plane as a target vehicle rectangle. The target vehicle rectangle may differ in size and shape, depending on whether the target vehicle VS is recognized as a small-sized vehicle or as a large-sized vehicle in the images. The memory 112 may hold multiple target vehicle rectangles, and the target vehicle rectangle may be selected based on image recognition. Thus, the ECU 11 may determine the target vehicle VS as the target vehicle rectangle that is a rectangular frame on XY coordinates. As indicated by the target vehicle VS in FIG. 2, the target vehicle rectangle may be held as a rectangle coupling the front right end Sfr, the front left end Sfl, a rear left end Srl, and a rear right end Srr. In addition, a rectangle occupied by the vehicle VM on the horizontal plane, i.e., an own vehicle rectangle, may be held in the memory 112 as a setting value.

In step S314, the ECU 11 may calculate an expression of a straight line, i.e., a target vehicle path expression, by using, for example, the speed and the direction of the target vehicle VS and data regarding the target vehicle rectangle. As the target vehicle path expression, the ECU 11 may calculate a target vehicle path expression (4) for the target vehicle right predicted path SR of the front right end Sfr of the target vehicle VS. In addition, the ECU 11 may calculate a target vehicle path expression (5) for the target vehicle left predicted path SL of the front left end Sfl.

$$ax+by+c_R=0 \tag{4}$$

$$ax+by+c_L=0 \tag{5}$$

FIGS. 2 and 3 illustrate the target vehicle right predicted path SR and the target vehicle left predicted path SL. Straight lines expressed by the target vehicle path expression (4) and the target vehicle path expression (5) may be the path of the front right end Sfr and the path of the front left end Sfl, and may thus be parallel to each other and have the same slope. Accordingly, constants a and b may be common to the target vehicle path expressions (4) and (5). Constants $c_R$ and $c_L$ may be different from each other.

In step S315, the ECU 11 may calculate coordinates of the intersection points i, based on the own vehicle path expressions (1) to (3) as three own vehicle path expressions indicating circles, and the target vehicle path expressions (4) and (5) as two target vehicle path expressions indicating straight lines. One circle of the vehicle VM can have the intersection point i with one straight line of the target vehicle VS at two places. Accordingly, the three circles of the vehicle VM and the two straight lines of the target vehicle VS can have 12 intersection points i as indicated by black circles in FIG. 3. Solutions of coordinates indicating 12 or less intersection points i may be obtained, from the own vehicle path expressions (1) to (3) indicating curves of the circles having the same center and different radii, and the target vehicle path expressions (4) and (5) indicating the two parallel straight lines. A case with no solution may be a case where the circles and the straight lines do not intersect each other and there is no intersection point i. In this manner, except for the case with no solution, it is possible to obtain the intersection points i as the candidates for the provisional contact point Pt where the predicted path of the vehicle VM contacts the predicted path of the target vehicle VS.

Figure 7:
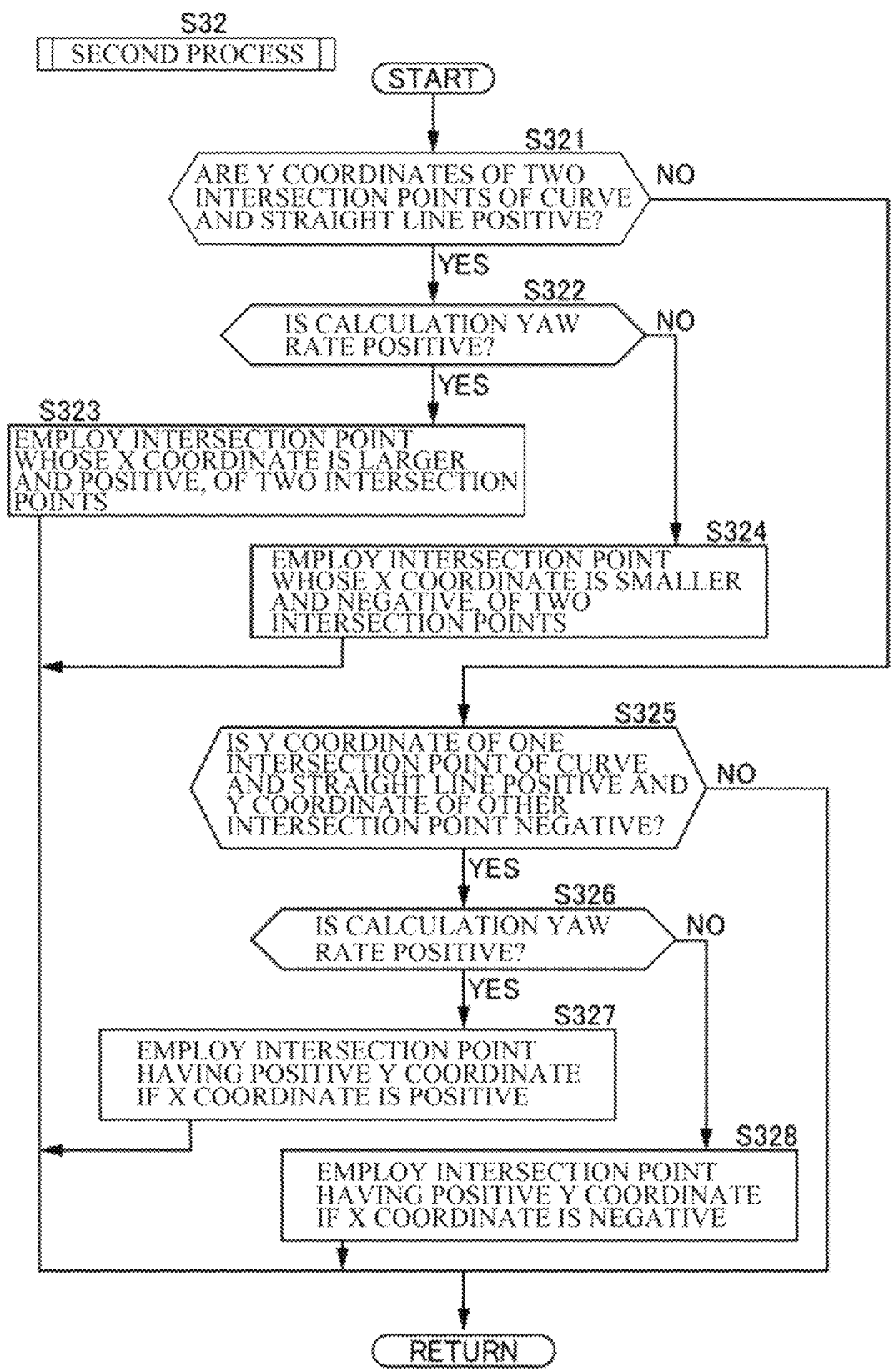
FIG. 7 is a flowchart illustrating a second process.

When step S315 ends, returning to FIG. 5, the ECU 11 may cause the flow to proceed to the second process in step S32. Step S32 is illustrated in FIG. 7. In step S32, the ECU 11 may exclude the intersection points i positioned outside the predetermined angle range from 0° to 90° both inclusive from the position of the vehicle VM at the prediction reference time Ts on the circles indicating the paths of the vehicle VM. Thus, on the own vehicle predicted paths, it is possible to obtain the intersection points i as the candidates for the provisional contact point Pt within the range of greater than or equal to 0° and less than or equal to 90°, i.e., the predetermined angle range, from the position of the vehicle VM at the prediction reference time Ts.

The second process illustrated in FIG. 7 may be performed for each of the curves of the three concentric circles of the vehicle VM, for each of the two straight lines of the target vehicle VS. The ECU 11 may calculate solutions based on six simultaneous equations of the own vehicle path expression (1) and the target vehicle path expression (4), the own vehicle path expression (1) and the target vehicle path expression (5), the own vehicle path expression (2) and the target vehicle path expression (4), the own vehicle path expression (2) and the target vehicle path expression (5), the own vehicle path expression (3) and the target vehicle path expression (4), and the own vehicle path expression (3) and the target vehicle path expression (5). When the curve of one circle and one straight line intersect each other, they have two intersection points i, and two solutions may be obtained from the simultaneous equation. The second process may be performed for each of six combinations of the curves of the circles and the straight lines.

In step S321, the ECU 11 may determine whether Y coordinates of the two intersection points i of the curve of one circle and one straight line, obtained from the simultaneous equation, are positive. In the case of FIG. 3, the Y coordinates of two intersection points irr of the own vehicle right predicted path MR and the target vehicle right predicted path SR are positive, and the Y coordinates of the two intersection points are positive also for other combinations of the curves of the circles and the straight lines. If the Y coordinates of the two intersection points are positive (YES in step S321), the ECU 11 may cause the flow to proceed to step S322. If the Y coordinates of the two intersection points are not positive (NO in step S321), the ECU 11 may cause the flow to proceed to step S325.

Figure 8:
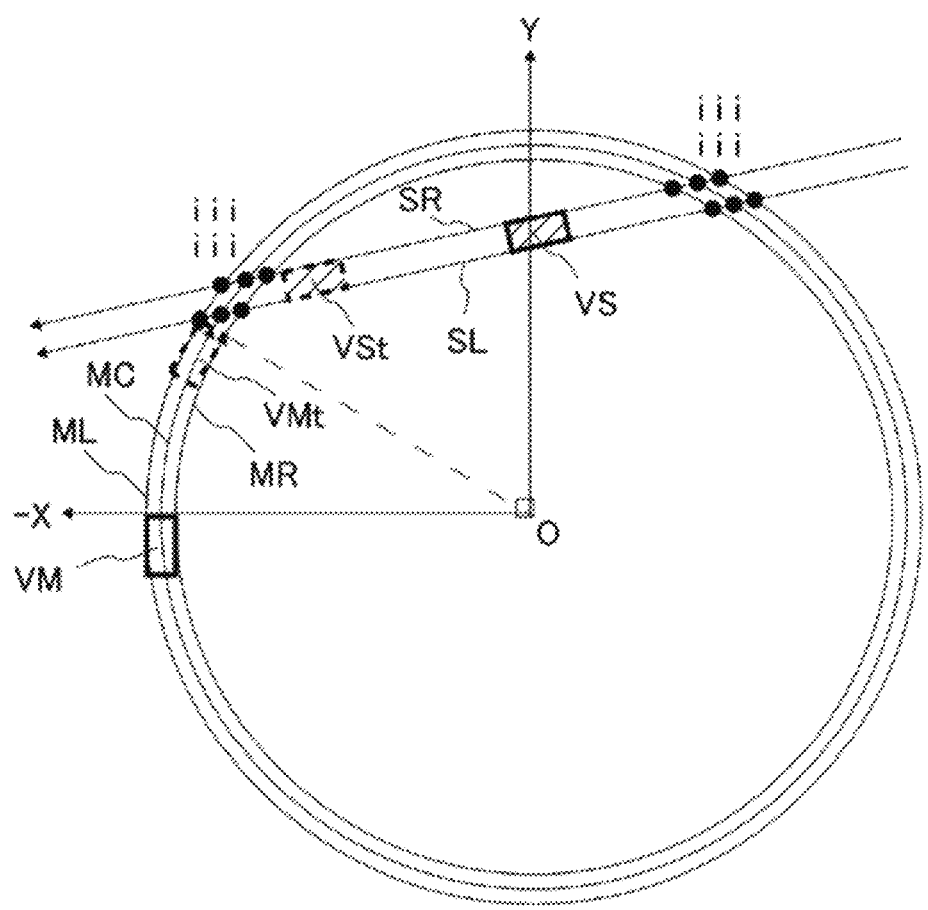
FIG. 8 is an overall view of predicted traveling paths of the vehicle and the target vehicle when the vehicle makes a right turn.

In step S322, the ECU 11 may determine whether the calculation yaw rate Yr of the vehicle VM is positive. When the calculation yaw rate Yr is positive, the vehicle VM turns left. In the case of FIGS. 2 and 3, the vehicle VM turns left, and the calculation yaw rate Yr is positive. If the calculation yaw rate Yr is positive (YES in step S322), the ECU 11 may cause the flow to proceed to step S323. If the calculation yaw rate Yr is not positive (NO in step S322), the ECU 11 may cause the flow to proceed to step S324. FIG. 8 illustrates, for example, the vehicle VM, the target vehicle VS, the own vehicle predicted path, and the target vehicle predicted path on the XY coordinates, when the calculation yaw rate Yr is negative. The vehicle VM is on the left side with respect to the origin O that is the center of the circles indicating the own vehicle predicted paths, indicated by the own vehicle right predicted path MR, the own vehicle middle predicted path MC, and the own vehicle left predicted path ML. An X coordinate of the vehicle VM is thus negative. In addition, in FIG. 8, the vehicle VM turns right, and the calculation yaw rate Yr is negative. Note that the absolute value of the yaw rate to be used to obtain the calculation yaw rate Yr is continuously greater than or equal to the turning reference value for the predetermined period, based on step S2 illustrated in FIG. 4. Accordingly, there is no case where the calculation yaw rate Yr is 0 (zero), and the calculation yaw rate Yr is negative if a result of the determination in step S322 is NO.

In step S323, the ECU 11 may employ the intersection point i whose X coordinate is larger and positive, of the two intersection points i, and end the second process. In FIG. 3, six intersection points i having positive X coordinates and positioned on the right side with respect to a Y-axis may be employed, of the 12 intersection points i obtained from the six combinations of the circles and the straight lines.

In step S324, the ECU 11 may employ the intersection point i whose X coordinate is smaller and negative, of the two intersection points i, and end the second process. Step S324 may be executed when it is determined that the calculation yaw rate Yr is negative in step S322. FIG. 8 illustrates a case of a right turn where the calculation yaw rate Yr is negative, and six intersection points i having negative X coordinates and positioned on the left side with respect to the Y-axis may be employed.

In contrast, step S325 may be executed if a result of the determination regarding the Y coordinates is NO in step S321 as the first step of the second process. In step S325, the ECU 11 may determine whether the Y coordinate of one intersection point i of the curve of the circle and the straight line is positive, and the Y coordinate of the other intersection point i is negative. In a case as in FIG. 9, a result of the determination in step S325 is YES. If the result of the determination in step S325 is YES, the ECU 11 may cause the flow to proceed to S326. If the result of the determination in step S325 is NO, the ECU 11 may end the second process. There is no intersection point i employed when the result of the determination in step S325 is NO.

Figure 9:
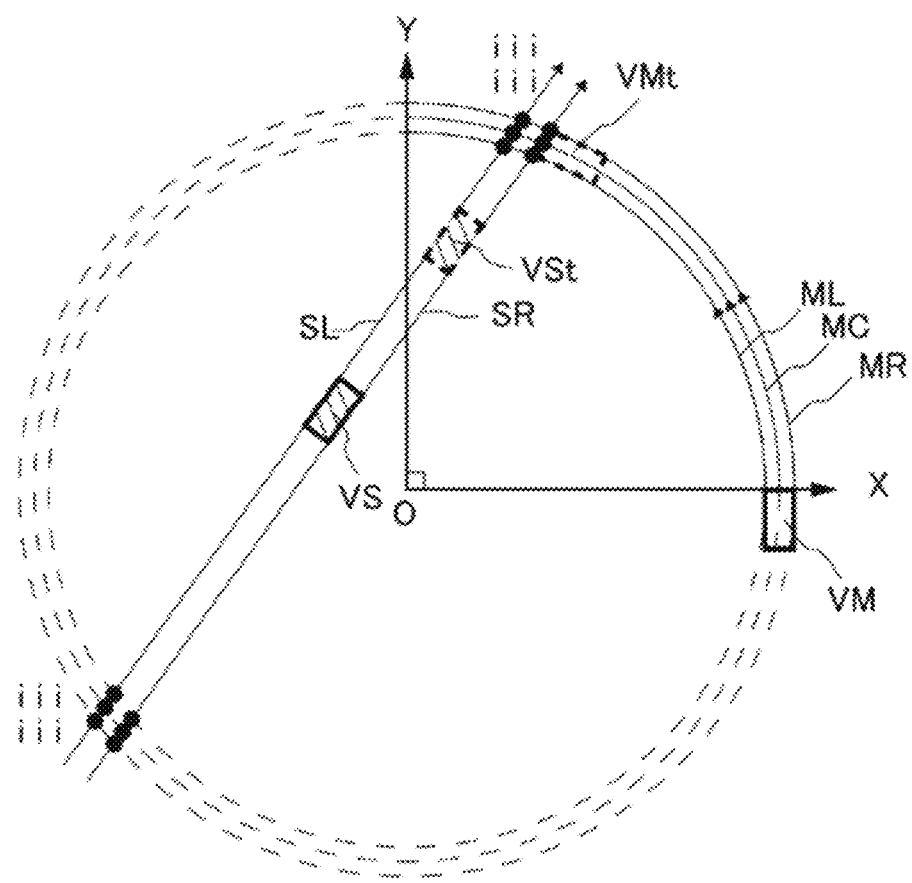
FIG. 9 is an overall view of predicted traveling paths of the vehicle and the target vehicle when the vehicle makes a left turn.

In step S326, the ECU 11 may determine whether the calculation yaw rate Yr is positive. When the calculation yaw rate Yr is positive, the vehicle VM turns left. If the calculation yaw rate Yr is positive (YES in step S326), the ECU 11 may cause the flow to proceed to step S327. If the calculation yaw rate Yr is not positive (NO in step S326), the ECU 11 may cause the flow to proceed to step S328. Note that there is no case where the calculation yaw rate Yr is 0 (zero), based on step S2 illustrated in FIG. 4. Accordingly, the calculation yaw rate Yr is negative if a result of the determination in step S326 is NO. FIG. 9 illustrates a case where the calculation yaw rate Yr is positive (YES in step S326).

In step S327, the ECU 11 may employ the intersection point i having a positive Y coordinate, if the X coordinate is positive, and end the second process. In the case of FIG. 9, six intersection points i on the right side may be employed.

When the vehicle VM makes a right turn and the calculation yaw rate Yr is negative, in step S328, the ECU 11 may employ the intersection point i having a positive Y coordinate, if the X coordinate is negative, and end the second process.

As described above, the second process may be performed for each of the six combinations of the curves and the straight lines. When all the three circles intersect the two straight lines as illustrated in FIG. 3, six intersection points i on the right side may be employed by the second process. A region around the employed intersection points i in FIG. 3 illustrating a left turn is enlarged and illustrated as intersection points i1 to i6 in FIG. 2. In contrast, in FIG. 8 in which the vehicle VM makes a right turn, six intersection points i on the left side may be employed.

When the second process ends, in step S33 illustrated in FIG. 5, the ECU 11 may set, as the provisional contact point Pt, the intersection point i to be reached by the vehicle VM in a minimum time, of the employed intersection points i. The vehicle VM reaches the intersection point i1 in the minimum time, of the employed intersection points i1 to i6 in FIG. 2. The intersection point i1 may thus serve as the provisional contact point Pt. In FIG. 2, the vehicle VM moves and reaches the provisional contact point Pt to be the vehicle VMt. In addition, the ECU 11 may calculate the provisional contact time Tt that is a time when the vehicle VM moves to be positioned at the vehicle VMt.

Figure 10:
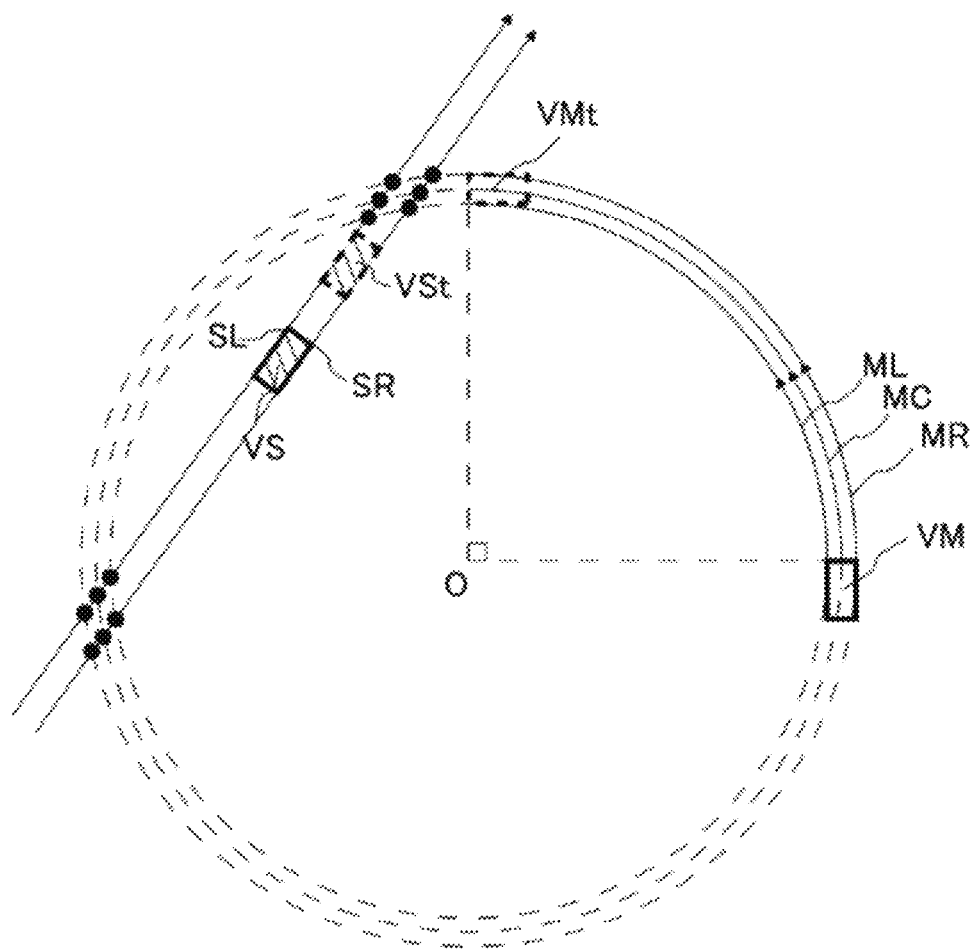
FIG. 10 is an overall view illustrating a case where intersection points are at positions outside a predetermined angle range from 0° to 90° both inclusive.
Figure 11:
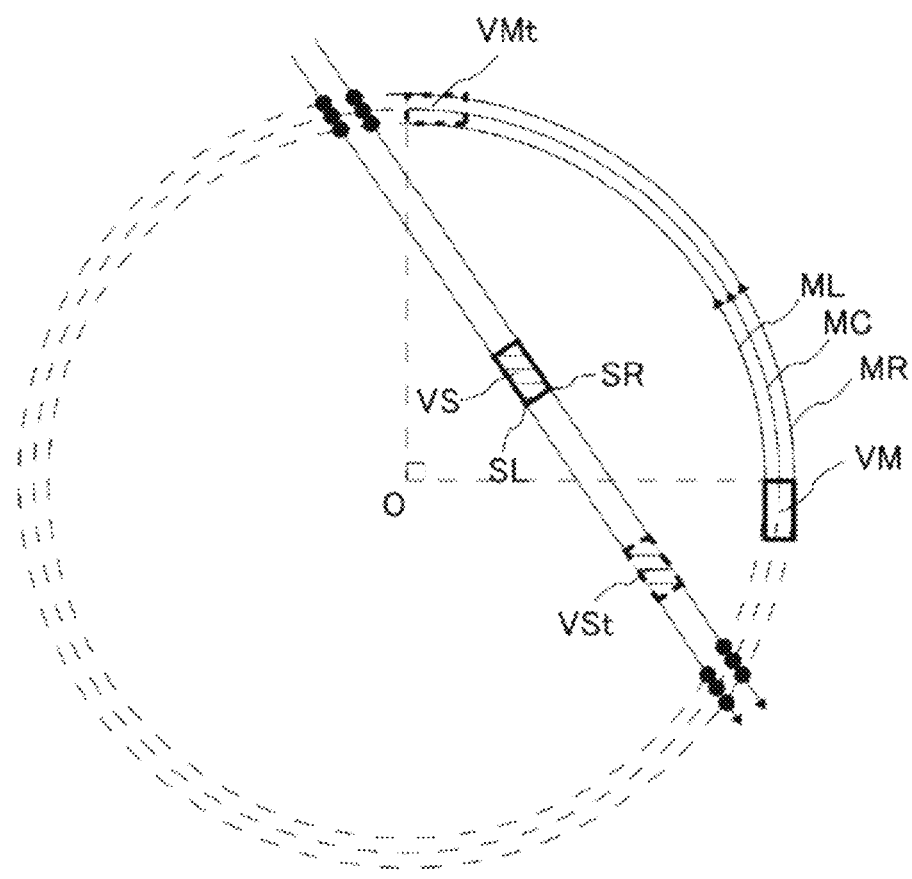
FIG. 11 is an overall view illustrating a case where intersection points are at positions outside the predetermined angle range from 0° to 90° both inclusive.

In step S34, when there is no intersection point i employed, the ECU 11 may set a time when the vehicle VM turns by 90° as the provisional contact time Tt. In cases of FIGS. 10 and 11, the circles indicating the paths of the vehicle VM and the straight lines of the target vehicle VS have the 12 intersection points i, but there is no intersection point i employed in the second process. When all the intersection points i are at positions outside the predetermined angle range from 0° to 90° both inclusive, as illustrated in FIGS. 10 and 11, the time when the vehicle VM turns by 90°, i.e., the upper limit of the predetermined angle range, and moves to the vehicle VMt may be set as the provisional contact time Tt. Also in a case where the curves of the circles and the straight lines do not intersect each other, the time when the vehicle VM turns by 90°, i.e., the upper limit of the predetermined angle range, may be set as the provisional contact time Tt. In the above manner, the first stage of the contact determination process may end.

Figure 12:
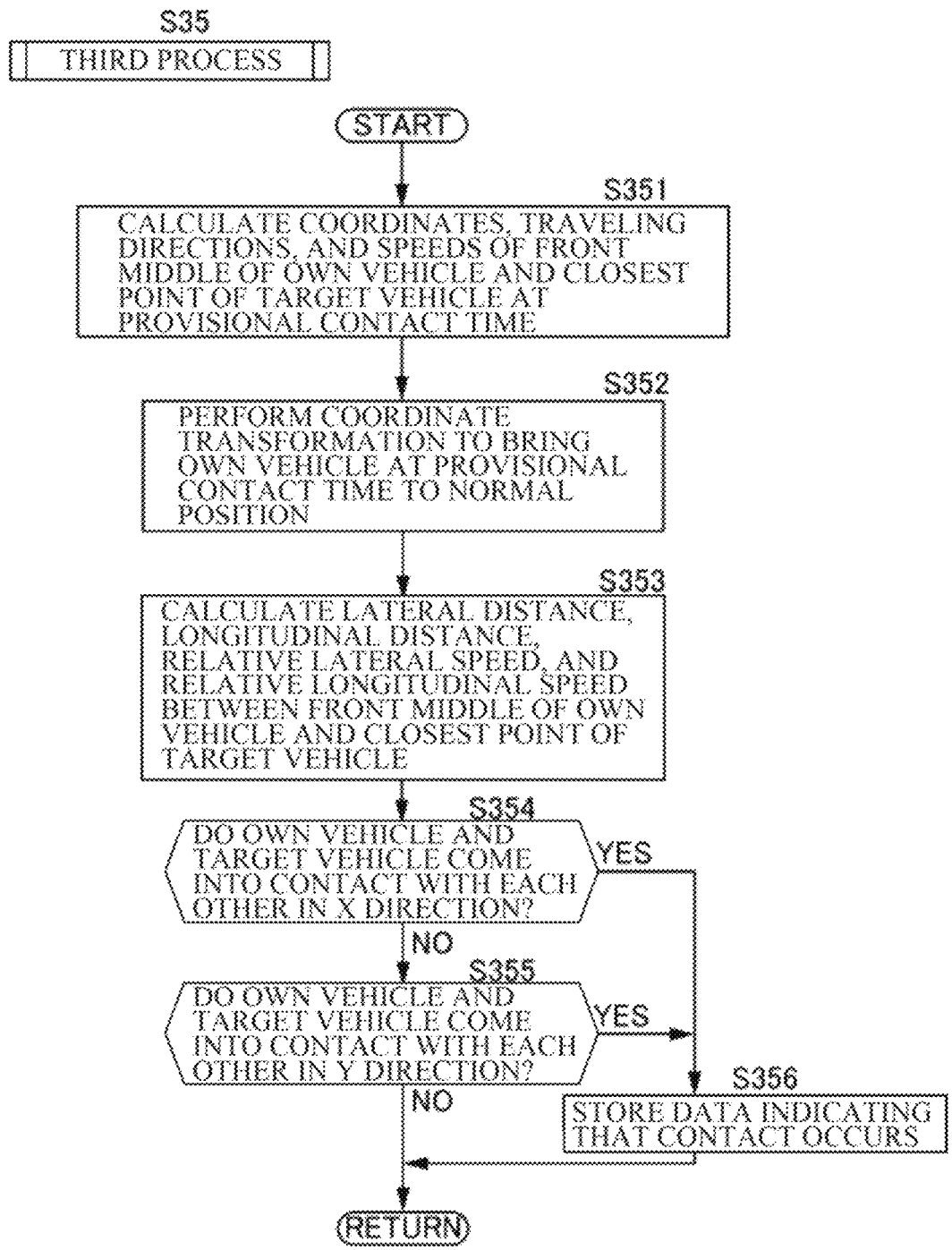
FIG. 12 is a flowchart illustrating a third process.

As illustrated in FIG. 5, when step S34 ends, the ECU 11 may perform the third process in step S35. The third process may be the second stage of the contact determination process. In the third process, the ECU 11 determines whether the vehicle VM and the target vehicle VS come into contact with each other, assuming that the vehicle VMt and the target vehicle VSt at the provisional contact time Tt travel straight to cross each other. The own vehicle right predicted path MRp, the own vehicle middle predicted path MCp, and the own vehicle left predicted path MLp in FIG. 2 may be predicted paths assuming that the vehicle VMt travels straight. The third process in step S35 is illustrated in FIG. 12. In the third process, the ECU 11 may perform coordinate transformation to bring the vehicle VM at the provisional contact time Tt to a normal position, and thereafter perform contact determination by using a lateral distance Dx and a relative lateral speed Vx, and a longitudinal distance Dy and a relative longitudinal speed Vy.

In step S351, the ECU 11 may calculate the coordinates of the front middle Mfc of the vehicle VMt at the provisional contact time Tt indicated by the dotted line in FIG. 2. In addition, the ECU 11 may calculate a closest point Sc, of the target vehicle VSt, closest to the front middle Mfc of the vehicle VMt at the provisional contact time Tt illustrated in FIG. 2. In the case of FIG. 2, the front right end Sfr of the target vehicle VSt is the closest point Sc. The ECU 11 may obtain the coordinates, the traveling direction, and the speed of the front middle Mfc of the vehicle VMt, and the coordinates, the traveling direction, and the speed of the closest point Sc, i.e., the front right end Sfr of the target vehicle VSt. It is assumed that the vehicle VM and the target vehicle VS are unchanged in speed from the prediction reference time Ts, and that the target vehicle VS is also unchanged in traveling direction from the prediction reference time Ts. Accordingly, used as the speed of the front middle Mfc of the vehicle VMt and the traveling direction and the speed of the front right end Sfr of the target vehicle VSt may be those at the prediction reference time Ts.

In step S352, the ECU 11 may perform coordinate transformation on the calculated coordinates and traveling direction of the front middle Mfc of the vehicle VMt, and the calculated coordinates and traveling direction of the front right end Sfr serving as the closest coordinates of the target vehicle VSt, to bring the vehicle VMt at the provisional contact time Tt to the normal position where its front direction faces the +Y direction. The ECU 11 may also perform coordinate transformation on the rectangle of the vehicle VMt and the rectangle of the target vehicle VSt.

Figure 13:
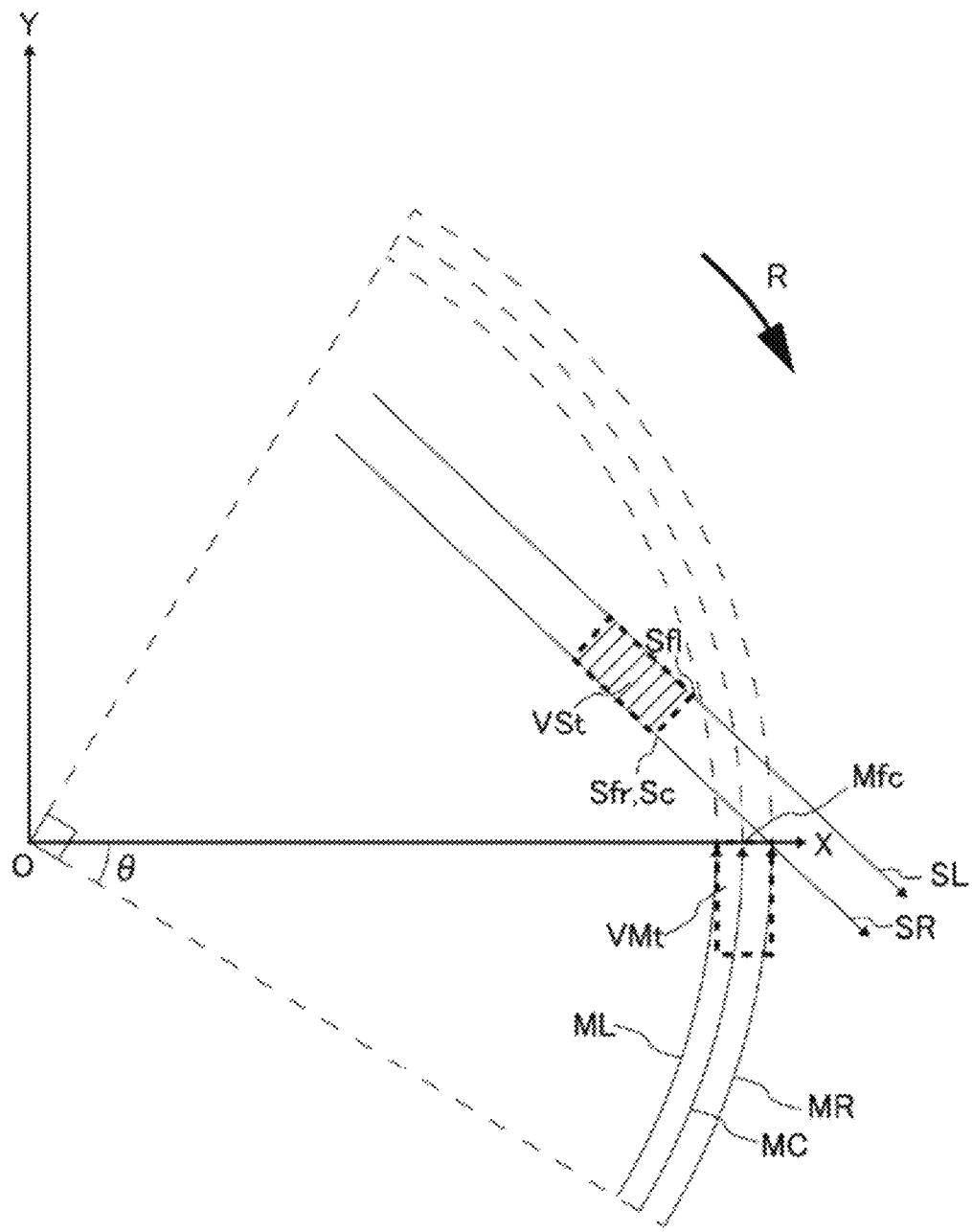
FIG. 13 is a diagram illustrating traveling paths after rotational coordinate transformation.

In FIG. 2, a straight line Oc couples the provisional contact point Pt and the origin O. An angle θ is formed between the straight line Oc and an X-axis. FIG. 13 illustrates a relationship between, for example, the vehicle VMt and the target vehicle VSt after the coordinate transformation at the provisional contact time Tt. In this coordinate transformation, first, as illustrated in FIG. 13, the coordinates may be rotated by the angle θ in a direction of an arrow R, around the origin O, i.e., the turning center of the vehicle VM. This rotation allows the front of the vehicle VMt to face the +Y direction.

Figure 14:
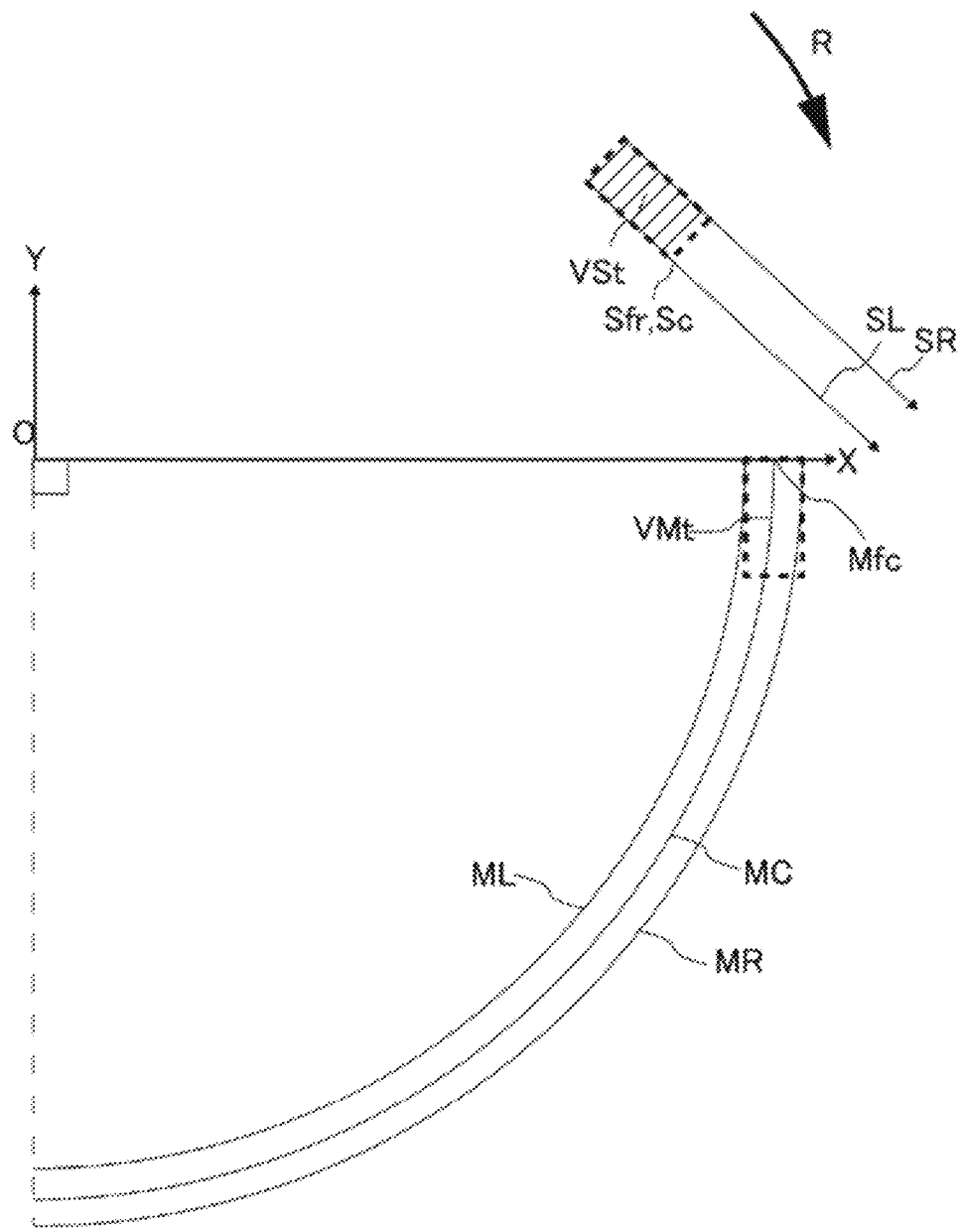
FIG. 14 is a diagram illustrating traveling paths after rotational coordinate transformation.

FIG. 13 illustrates a case where there are the intersection points i as the candidates for the provisional contact point Pt. FIG. 14 illustrates a situation after the coordinate transformation at the provisional contact time Tt, in a case where there is no intersection point i after the process of excluding the intersection points i is performed. This corresponds to a case where, in step S34, the ECU 11 determines that there is no intersection point, and sets the time when the vehicle VM turns by 90°, i.e., the upper limit of the predetermined angle range, as the provisional contact time Tt. Accordingly, in step S352, the ECU 11 may perform coordinate transformation of rotating the coordinates by 90° in the direction of the arrow R around the origin O, i.e., the turning center of the vehicle VM. FIG. 14 illustrates, for example, the vehicle VMt and the target vehicle VSt after the coordinate transformation by 90°.

Figure 15:
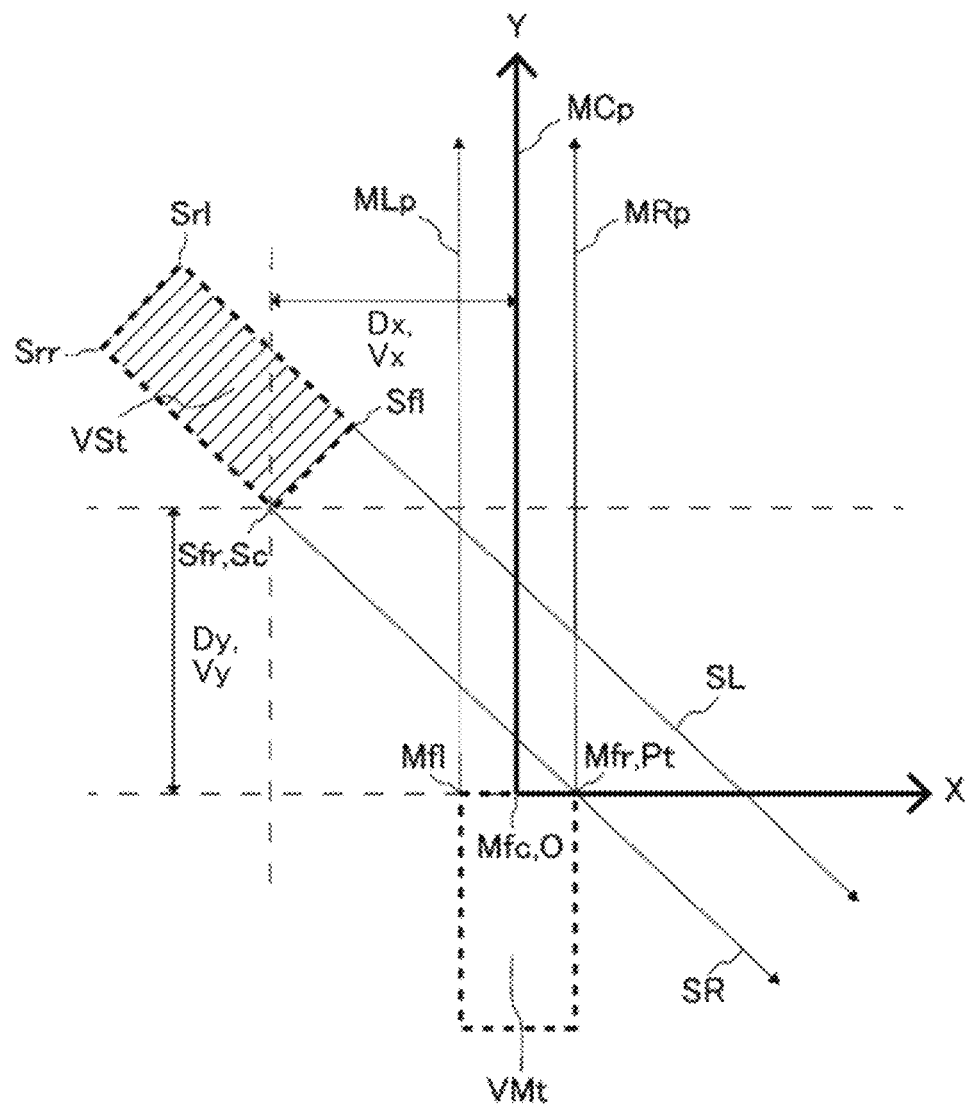
FIG. 15 is a diagram illustrating positions after coordinate transformation of the vehicle and the target vehicle at a provisional contact time.

After such rotational coordinate transformation, the ECU 11 may perform translational coordinate transformation in a direction of the X-axis. The translational coordinate transformation may be performed to bring the front middle Mfc of the vehicle VMt to the position of the origin O. FIG. 15 is an enlarged view of, for example, the vehicle VMt and the target vehicle VSt at the provisional contact time Tt, disposed on a new XY coordinate system at the end of the coordinate transformation.

In subsequent step S353, the ECU 11 may calculate the lateral distance Dx, the longitudinal distance Dy, the relative lateral speed Vx, and the relative longitudinal speed Vy between the vehicle VMt and the target vehicle VSt. FIG. 15 illustrates straight lines indicating the own vehicle right predicted path MRp, the own vehicle middle predicted path MCp, the own vehicle left predicted path MLp, the target vehicle right predicted path SR, and the target vehicle left predicted path SL, assuming that the vehicle VMt and the target vehicle VSt at the provisional contact time Tt travel straight. On the XY coordinates in FIG. 15, the front middle Mfc of the vehicle VMt is positioned at the origin O, the front of the vehicle VMt faces the +Y direction, and the own vehicle middle predicted path MCp extending straight overlaps with the Y-axis.

The lateral distance Dx, the longitudinal distance Dy, the relative lateral speed Vx, and the relative longitudinal speed Vy illustrated in FIG. 15 may be obtained between the front middle Mfc of the vehicle VMt and the closest point Sc of the target vehicle VSt at the provisional contact time Tt. The lateral distance Dx and the longitudinal distance Dy may respectively be the absolute value of the X coordinate and the absolute value of the Y coordinate of the closest point Sc in FIG. 15. The vehicle VMt after the coordinate transformation does not move in an X direction, and the speed of the closest point Sc of the target vehicle VSt in the X direction may thus be the relative lateral speed Vx. In addition, the ECU 11 may calculate the relative longitudinal speed Vy by subtracting the speed of the closest point Sc of the target vehicle VSt from the speed of the front middle Mfc of the vehicle VMt in a Y direction. Regarding the relative speed in the Y direction, the speed of the vehicle VM at the prediction reference time Ts may be assumed to be unchanged, and the speed of the vehicle VMt in the Y direction at the provisional contact time Tt may be used.

In subsequent step S354, the ECU 11 may determine whether the target vehicle VS comes into contact with the vehicle VM, regarding the X direction. The ECU 11 may obtain an X direction time-to-contact Tx based on an expression (6).

$$X \text{ direction time-to-contact } Tx = \text{lateral distance } Dx/\text{relative lateral speed } Vx \quad (6)$$

Thereafter, the ECU 11 may calculate the own vehicle rectangle of the vehicle VM and the target vehicle rectangle of the target vehicle VS after elapse of the X direction time-to-contact Tx from the provisional contact time Tt. When the own vehicle rectangle and the target vehicle rectangle are in contact with or overlap with each other, the ECU 11 may determine that contact occurs. If the ECU 11 determines that contact occurs (YES in step S354), the ECU 11 may cause the flow to proceed to step S356. If the ECU 11 determines that no contact occurs (NO in step S354), the ECU 11 may cause the flow to proceed to step S355.

In step S355, the ECU 11 may determine whether the target vehicle VS comes into contact with the vehicle VM, regarding the Y direction. The ECU 11 may obtain a Y direction time-to-contact Ty based on an expression (7).

$$Y \text{ direction time-to-contact } Ty = \text{longitudinal distance } Dy/\text{relative longitudinal speed } Vy \quad (7)$$

Thereafter, the ECU 11 may calculate the own vehicle rectangle of the vehicle VM and the target vehicle rectangle of the target vehicle VS after elapse of the Y direction time-to-contact Ty from the provisional contact time Tt. When the own vehicle rectangle and the target vehicle rectangle are in contact with or overlap with each other, the ECU 11 may determine that contact occurs. If the ECU 11 determines that contact occurs (YES in step S355), the ECU 11 may cause the flow to proceed to step S356. If the ECU 11 determines that no contact occurs (NO in step S355), the ECU 11 may end the third process in step S35 and return to the main routine.

Figure 16:
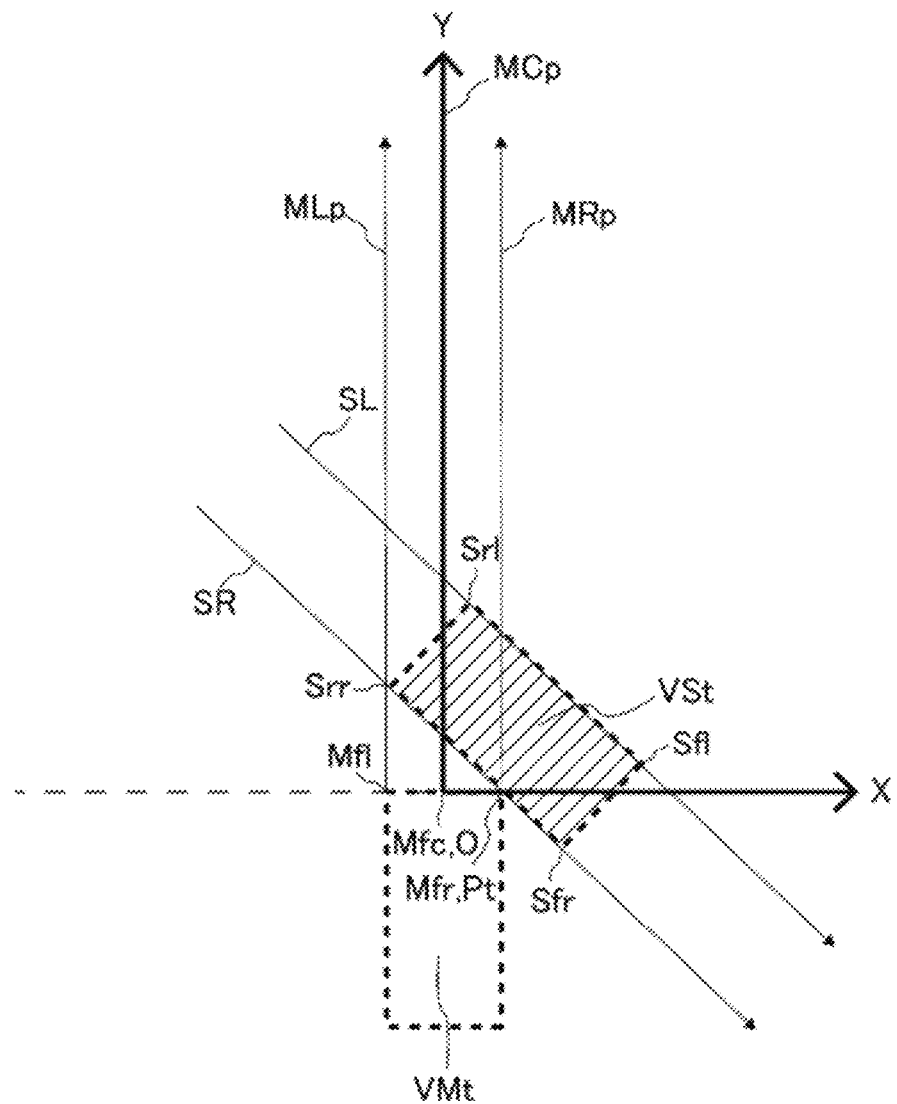
FIG. 16 is a diagram illustrating positions after coordinate transformation when the vehicle and the target vehicle are in contact with each other at the provisional contact time.
Figure 17:
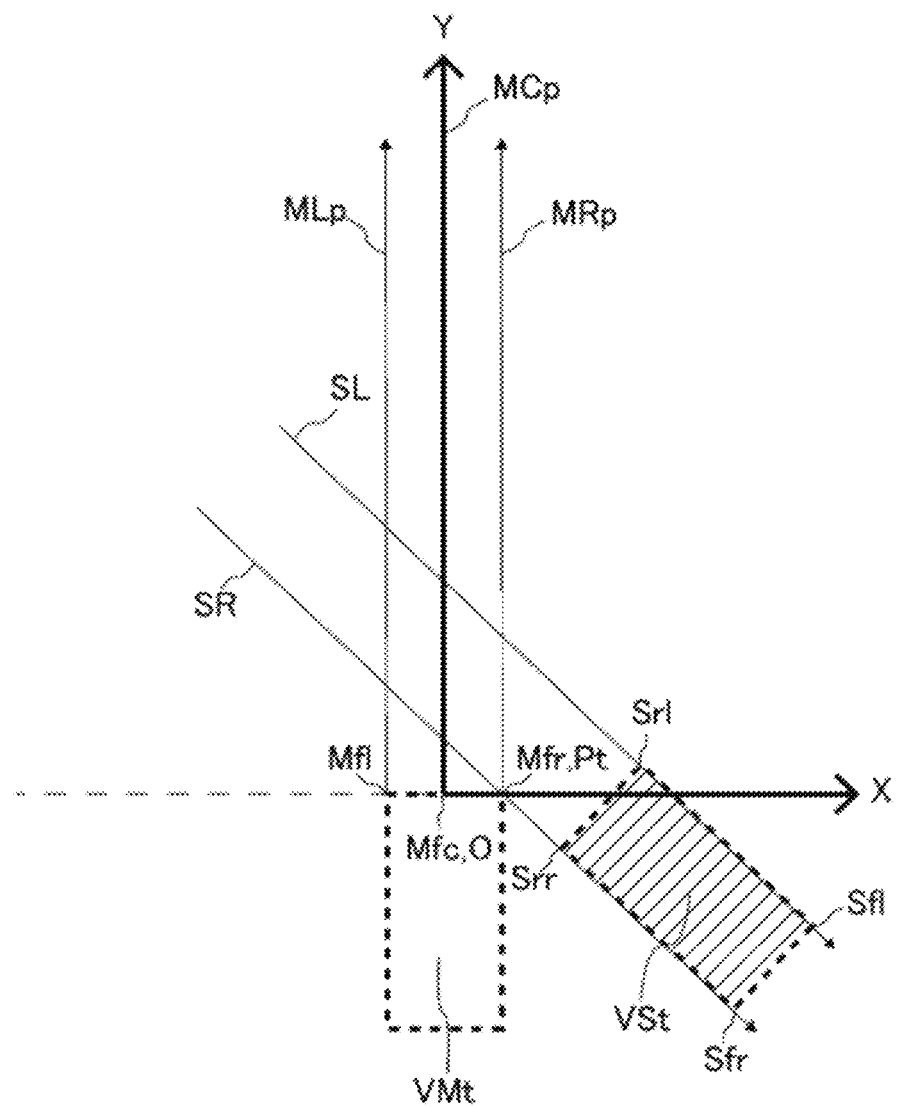
FIG. 17 is a diagram illustrating positions after coordinate transformation when the vehicle and the target vehicle have passed by each other at the provisional contact time.

Note that, when the target vehicle VSt is in contact with the vehicle VMt as in FIG. 16 at the provisional contact time Tt, the ECU 11 may determine that contact occurs (YES). In contrast, when the target vehicle VS has traveled past a traveling range of the vehicle VM as in FIG. 17 at the provisional contact time Tt, the ECU 11 may determine that no contact occurs (NO). In FIG. 17, the target vehicle VSt is traveling to the positive side in the X direction and, at the provisional contact time Tt, all the X coordinates of the target vehicle VSt are larger than the own vehicle right predicted path MRp that is the own vehicle predicted path of the vehicle VMt on the positive side in the X direction. It may thus be determined that the target vehicle VS has traveled past the traveling range of the vehicle VM.

In step S356, the ECU 11 may store data indicating that contact occurs, thereafter end the third process in step S35, and return to the main routine. When the third process in step S35 ends, the contact determination process in step S3 may end as illustrated in FIG. 5, and the ECU 11 may return to the main routine in FIG. 4.

In FIG. 4, when the contact determination process in step S3 ends, the ECU 11 may determine in step S4 whether a determined emergency level of the contact indicated by the stored data is high. If data indicating that contact occurs is not held or the ECU 11 determines that the emergency level is not high (NO in step S4), the ECU 11 may end the process. For example, when there is a margin of greater than or equal to a predetermined time period before a time of contact obtained based on, for example, the X direction time-to-contact Tx or the Y direction time-to-contact Ty, it may be determined that the emergency level is not high. If the ECU 11 determines that the determined emergency level of the contact indicated by the stored data is high (YES in step S4), the ECU 11 may end the process after performing the contact response operation such as automatic braking in step S5. Upon activation of the automatic braking, the ECU 11 may transmit a braking signal to the braking device 2 via the communication line 3 to apply a brake to the vehicle VM, making it possible to avoid the contact with the target vehicle VS.

As described above, in the first stage, the ECU 11 calculates the own vehicle predicted path indicated by a circle having a radius obtained from the yaw rate and the speed of the vehicle VM, calculates the provisional contact point Pt, and calculates the provisional contact time Tt. In the second stage, the ECU 11 performs contact determination assuming that the vehicle VM and the target vehicle VS travel straight after the provisional contact time Tt. Thus, it is possible to make a prediction with a small amount of calculation, making it possible to suppress a processing load on the CPU 111.

In the example embodiments, the calculation yaw rate Yr may be obtained based on the yaw rates at multiple time points calculated based on, for example, the steering wheel rotation angle. In some embodiments, the calculation yaw rate Yr may be obtained by correcting, based on the past yaw rate, the latest yaw rate at the prediction reference time Ts. For example, the yaw rate at the latest timing may be calculated based on the past yaw rate and a yaw rate change rate, and the latest yaw rate corrected by being averaged with the yaw rate obtained at the prediction reference time Ts may be determined as the calculation yaw rate Yr.

In the example embodiments, using 90° as a setting angle, a time when the vehicle VM turns by 90° may be set as the provisional contact time Tt, but another angle may be used as the setting angle. For example, a time when the vehicle VM turns by 120° or 60° may be set as the provisional contact time Tt. In addition, in the example embodiments, the intersection points i serving as the candidates for the provisional contact point Pt may be calculated by using, as the own vehicle predicted path, three own vehicle predicted paths of the own vehicle right predicted path MR, the own vehicle middle predicted path MC, and the own vehicle left predicted path ML. Although accuracy of the determination decreases slightly, two own vehicle predicted paths excluding the own vehicle middle predicted path MC may be used, or the own vehicle middle predicted path MC may be used.

In the example embodiments, the provisional contact time Tt may be calculated by using the own vehicle right predicted path MR, the own vehicle middle predicted path MC, and the own vehicle left predicted path ML. In some embodiments, the provisional contact time Tt may be calculated by using the own vehicle right predicted path MR and the own vehicle left predicted path ML, without using the own vehicle middle predicted path MC. In addition, in the example embodiments, the own vehicle predicted path may be the predicted path of each part of the front of the vehicle VM. In some embodiments, the predicted path of a portion other than the front may be used as the own vehicle predicted path, or the own vehicle predicted path may be used without determining a specific portion.

In the example embodiments, the provisional contact point Pt may be calculated assuming that the target vehicle VS travels in a uniform linear motion, and the provisional contact time Tt may be calculated. In some embodiments, in a case where the target vehicle VS is also traveling along a curve, a degree of the curve may be calculated based on, for example, camera images, the provisional contact point may be calculated assuming a predicted path indicated by a circle having a predetermined radius, as with the vehicle VM, and the provisional contact time may be calculated.

In addition, in the example embodiments, in the third process in the second stage after the provisional contact time Tt, the lateral distance Dx, the relative lateral speed Vx, the longitudinal distance Dy, and the relative longitudinal speed Vy may be calculated regarding the closest point Sc, i.e., a portion of the target vehicle VS that is closest to the front middle Mfc of the vehicle VM. Contact determination may be performed based on whether the target vehicle VS is in contact with or overlaps with the vehicle VM after elapse of the X direction time-to-contact Tx obtained from the lateral distance Dx and the relative lateral speed Vx, or the Y direction time-to-contact Ty obtained from the longitudinal distance Dy and the relative longitudinal speed Vy. In some embodiments, another contact determination process between straight traveling vehicles may be used for the determination in the second stage.

In addition, in the example embodiments, the position, etc. of the target vehicle VS may be detected based on data obtained from the cameras 12 and the radar sensors 13. In some embodiments, the position, etc. of the target vehicle VS may be detected based on data obtained from either the cameras 12 or the radar sensors 13. The position, etc. of the target vehicle VS may be detected based on data obtained from all or a portion of the cameras 12, the radar sensors 13, and other devices.

In the example embodiments, for example, the cameras 12 and the radar sensors 13 may be used. Any of various sensors may be used as long as the sensor is configured to detect a relative relationship, including a relative position and a relative speed, with respect to the target vehicle VS.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to at least one embodiment of the disclosure, even while an own vehicle is turning, it is possible to predict contact between the own vehicle and a target vehicle as they meet, and determine to avoid the contact by, for example, braking.

As used herein, the term "collision" may be used interchangeably with the term "contact".

The ECU 11 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 11 illustrated in FIG. 1.

The invention claimed is:

1. A driving assistance apparatus comprising an electronic control unit configured to:
   calculate a first predicted path of a first vehicle to which the driving assistance apparatus is to be applied, the first predicted path being defined as a circular arc having a radius calculated from a yaw rate and a speed of the first vehicle at a prediction reference time;
   calculate a second predicted path of a second vehicle, the second predicted path being defined as a straight line based on a position, a traveling direction, and a speed of the second vehicle at the prediction reference time;
   identify an intersection point between the first predicted path and the second predicted path as a provisional contact point;
   calculate a provisional contact time at which the first vehicle reaches the provisional contact point;
   determine whether the first vehicle and the second vehicle come into contact with each other, by using a relative position and a relative speed of the first and second vehicles at the provisional contact time, and by assuming that, after the provisional contact time, the first vehicle and the second vehicle travel in linear motion to cross each other; and
   control a braking device of the first vehicle to perform automatic braking in response to determining that the first vehicle and the second vehicle come into contact with each other.

2. The driving assistance apparatus according to claim 1, wherein, when calculating the provisional contact time, the electronic control unit is configured to exclude the intersection point positioned outside a predetermined angle range from a position of the first vehicle at the prediction reference time on the circular arc.

3. The driving assistance apparatus according to claim 1, wherein, when calculating the provisional contact time, the electronic control unit is configured to:
   calculate the intersection point of the first predicted path and the second predicted path, by using the first predicted path on a right side of the first vehicle and the first predicted path on a left side of the first vehicle, and using the second predicted path on a right side of the second vehicle and the second predicted path on a left side of the second vehicle;
   store the intersection point to be reached by the first vehicle in a minimum time as the provisional contact point; and
   store a time when the first vehicle reaches the provisional contact point as the provisional contact time.

4. The driving assistance apparatus according to claim 2, wherein, when calculating the provisional contact time, the electronic control unit is configured to:
   calculate the intersection point of the first predicted path and the second predicted path, by using the first predicted path on a right side of the first vehicle and the first predicted path on a left side of the first vehicle, and using the second predicted path on a right side of the second vehicle and the second predicted path on a left side of the second vehicle;
   store the intersection point to be reached by the first vehicle in a minimum time as the provisional contact point; and
   store a time when the first vehicle reaches the provisional contact point as the provisional contact time.

5. The driving assistance apparatus according to claim 1, wherein the electronic control unit is configured to calculate the second predicted path, assuming that the second vehicle travels in a uniform linear motion.

6. The driving assistance apparatus according to claim 2, wherein the electronic control unit is configured to calculate the second predicted path, assuming that the second vehicle travels in a uniform linear motion.

7. The driving assistance apparatus according to claim 3, wherein the electronic control unit is configured to calculate the second predicted path, assuming that the second vehicle travels in a uniform linear motion.

8. The driving assistance apparatus according to claim 4, wherein the electronic control unit is configured to calculate the second predicted path, assuming that the second vehicle travels in a uniform linear motion.

9. A driving assistance method comprising:
- calculating a first predicted path of a first vehicle to which the driving assistance method is to be applied, the first predicted path being defined as a circular arc having a radius calculated from a yaw rate of the first vehicle at a prediction reference time;
- calculating a second predicted path of a second vehicle, the second predicted path being defined as a straight line based on a position, a traveling direction, and a speed of the second vehicle at the prediction reference time;
- identifying an intersection point between the first predicted path and the second predicted path as a provisional contact point;
- calculating a provisional contact time at which the first vehicle reaches the provisional contact point;
- determining whether the first vehicle and the second vehicle come into contact with each other, by using a relative position and a relative speed of the first and second vehicles at the provisional contact time, and by assuming that, after the provisional contact time, the first vehicle and the second vehicle travel in linear motion to cross each other; and
- controlling a braking device of the first vehicle to perform automatic braking in response to determining that the first vehicle and the second vehicle come into contact with each other.

10. A non-transitory computer readable recording medium containing a program, the program causing, when executed by a computer, the computer to implement a method, the method comprising:
- calculating a first predicted path of a first vehicle to which the method is to be applied, the first predicted path being defined as a circular arc having a radius calculated from a yaw rate of the first vehicle at a prediction reference time;
- calculating a second predicted path of a second vehicle, the second predicted path being defined as a straight line based on a position, a traveling direction, and a speed of the second vehicle at the prediction reference time;
- identifying an intersection point between the first predicted path and the second predicted path as a provisional contact point;
- calculating a provisional contact time at which the first vehicle reaches the provisional contact point;
- determining whether the first vehicle and the second vehicle come into contact with each other, by using a relative position and a relative speed of the first and second vehicles at the provisional contact time, and by assuming that, after the provisional contact time, the first vehicle and the second vehicle travel in linear motion to cross each other; and
- controlling a braking device of the first vehicle to perform automatic braking in response to determining that the first vehicle and the second vehicle come into contact with each other.

* * * * *